(12) United States Patent
Mohammadi (10) Patent No.: US 7,644,908 B1
(45) Date of Patent: Jan. 12, 2010

(54) WATER AERATION SYSTEM

(76) Inventor: Fereidoon Mohammadi, 3404 N. May Ave., Oklahoma City, OK (US) 73112

( * ) Notice: Subject to any disclaimer, the term of this patent is extended or adjusted under 35 U.S.C. 154(b) by 552 days.

(21) Appl. No.: 11/473,215

(22) Filed: Jun. 21, 2006

Related U.S. Application Data (60) Provisional application No. 60/801,860, filed on May 19, 2006.

(51) Int. Cl.
*B01F 3/04* (2006.01)

(52) U.S. Cl. .............. 261/76; 261/119.1; 261/DIG. 75

(58) Field of Classification Search .............. 261/76, 261/77, 119.1, DIG. 75
See application file for complete search history.

(56) References Cited

U.S. PATENT DOCUMENTS

| | | |
|---|---|---|
| 1,430,303 A | 9/1922 | Hartman |
| 1,574,783 A | 3/1926 | Beth |
| 3,043,433 A | 7/1962 | Singer |
| 3,243,046 A | 3/1966 | Kakumoto |
| 3,446,488 A | 5/1969 | Mail et al. |
| 3,775,314 A * | 11/1973 | Beitzel et al. ............ 210/760 |
| 3,865,721 A | 2/1975 | Kaelin |
| 3,900,420 A * | 8/1975 | Sebba ...................... 516/10 |
| 4,308,144 A * | 12/1981 | Saito ........................ 210/620 |
| 4,489,565 A * | 12/1984 | Taylor ........................ 62/59 |
| 5,051,213 A * | 9/1991 | Weske ...................... 261/78.2 |
| 5,254,292 A * | 10/1993 | Gabryelczyk et al. ........ 261/76 |
| 5,968,352 A * | 10/1999 | Ditzler ..................... 210/220 |

* cited by examiner

*Primary Examiner*—Scott Bushey
(74) *Attorney, Agent, or Firm*—Kenneth A. Roddy (57) ABSTRACT

An aeration pool or tank has a bottom piping assembly with an inlet at the bottom thereof and an outlet remote from the tank a distance vertically below the inlet, and an air inlet piping assembly having an inlet above the water surface and an outlet within the tank adjacent to the inlet of the bottom piping assembly. Water under pressure flows from the tank by gravity through the bottom piping assembly and draws air through the air inlet piping assembly, mixing it with the exiting water and the aerated water flows into a second body of water across a paddlewheel to disburse the aerated water into the second body of water and create circulation to absorb additional oxygen at the surface of the second body of water. A water circulation piping assembly in the tank creates turbulence and circulation within in the water in the tank.

13 Claims, 6 Drawing Sheets

WATER AERATION SYSTEM

CROSS REFERENCE TO RELATED APPLICATION

This application claims priority of U.S. Provisional Application Ser. No. 60/801,860, filed May 19, 2006.

BACKGROUND OF THE INVENTION

1. Field of the Invention

This invention relates generally to water treatment systems, and more particularly to a water aeration system and method for aerating water in an improved manner utilizing natural forces.

2. Background Art

Most conventional water aeration systems require pumps, compressors, or other machinery that consume energy to operate. While capable of introducing air into the water, air compressors and pumps typically output a low volume of air at a relatively high pressure, rather than a higher volume of lower pressure air more suitable for aeration. Consequently, to provide the desired amount of aerating bubbles, compressors frequently require significant amounts of input energy, which makes their operation expensive. In addition, the use of pistons and other associated moving linkages in air compressors increases noise and the likelihood of component breakdown, possible introduction of hydrocarbons into the water being aerated, and potentially expensive maintenance.

Some systems used in aeration of water employ spargers such as perforated pipe and the like for releasing the oxygen bearing gas into the bottom of a storage tank or holding pond. The dispersion of the released gases from the sparger may be further agitated by rotating vanes or multiple level baffles within the storage tank. For example, an arrangement for introducing the oxygen bearing gas in line with a propeller agitator is shown in U.S. Pat. No. 3,865,721 to Kaelin. Other efforts to directly agitate a fluid by releasing pressurized gas below the fluid surface and into flow directing columns are shown in U.S. Pat. Nos. 1,574,783 to Beth, 3,043,433 to Singer and 3,446,488 to Mail et al.

In providing oxygen for an aerobic system, air flow as is generally measured in cubic feet per minute (cfm) is highly important as it requires approximately 65 cubic feet of air for each pound of oxygen. A traditional rule of thumb relative to mechanical aeration systems is that two pounds of dissolved oxygen (DO) per horsepower hour is the expected level of recovery and the operating costs for such aeration systems has increased as power costs have increased. Further, the power requirements to overcome the hydraulic head of relatively deep containers or storage ponds, such as, up to a depth of about 20 feet often pose further economic disadvantage for the prior art diffuser and sparger systems.

It has also been known to use a pressure differential injector for drawing gas into a liquid stream as is shown in U.S. Pat. No. 1,430,303 to Hartman while similar such injector/mixer apparatus for other applications are shown in U.S. Pat. No. 3,243,046 to Kakumoto et al.

Venturi-type devices for intermingling of gases and fluids, are also known in the art, but have been primarily used for the purpose of agitation accomplished by release of air bubbles at the surface and are not particularly suited for meeting the continuous emulsification and large volume mixing demanded by water treatment facilities.

Accordingly, there has been a continuing need for economic and efficient methods and apparatus of gas/fluid intermingling adequate to meet the demands for odor control as in the use of anaerobic ponds and especially to meet the stringent regulations concerning effluence entering rivers and streams.

The present method and water aeration system utilizes the natural motion of running water and differential pressure to absorb oxygen into a body of water, a system of apparatus that creates turbulence within the body of water to efficiently mix oxygen from the atmosphere with water, and after the creation of the turbulence, passes the aerated water across a paddlewheel to distribute the aerated water evenly throughout a body of water and circulate the water to allow the surface of the body of water to absorb even more oxygen from the air above the water surface.

The present method and water aeration system may be used for aerating wastewater; in aquaculture applications to sustain marine life in lakes, ponds and other bodies of water; in agricultural applications, and in many other applications where a sufficient quantity of oxygen in the water is essential.

The present method and water aeration system does not require pumps, compressors, or other machinery that consume energy to operate, and thus conserves energy, and is environmental friendly. The system utilizes primarily PVC piping and thereby significantly reduces corrosion and maintenance costs, compared to conventional aeration systems.

SUMMARY OF THE INVENTION

An aeration pool or tank containing a body of water of sufficient depth to create hydrostatic pressure therein has a water outlet piping assembly including a water inlet end positioned at a bottom of the tank and a water outlet end remote from the tank and a distance vertically below the inlet end, and an air inlet piping assembly having an air inlet end positioned above the water surface and an air outlet end positioned within the pool or tank closely adjacent to the inlet end of the water outlet piping assembly. Water under pressure flows from the tank by gravity through the water outlet piping assembly and draws air from the atmosphere through the air inlet piping assembly and mixes it with the exiting water. The aerated water flows through the water outlet piping assembly into a second body of water across a paddlewheel to disburse the aerated water into the second body of water and create circulation of the second body of water to allow the surface of the second body of water to absorb additional oxygen from the air above the water surface. Water under pressure also enters a water circulation piping assembly in the tank that also draws air from the atmosphere into a common manifold and forces air out near the bottom of the tank to create turbulence and circulation within in the water in the tank.

DESCRIPTION OF THE PREFERRED EMBODIMENT

The present water aeration system and method utilizes a pool or aeration tank 10, having a bottom piping assembly 20, an air supply piping assembly 30, and a water circulation assembly 50. In the following discussion, for purposes of example only, and not limited thereto, the particular pool or aeration tank size, the various sizes of pipe, and the dimensions, described herein are suitable for use in a system handling 250 liters of water per second. It should be understood that the size of the pool or aeration tank, pipe sizes, and dimensions, may vary and the present system may be designed for any size aeration operations, from 50 liters to 2,000 liters per second.

Pool or Aeration Tank

Figure 1:
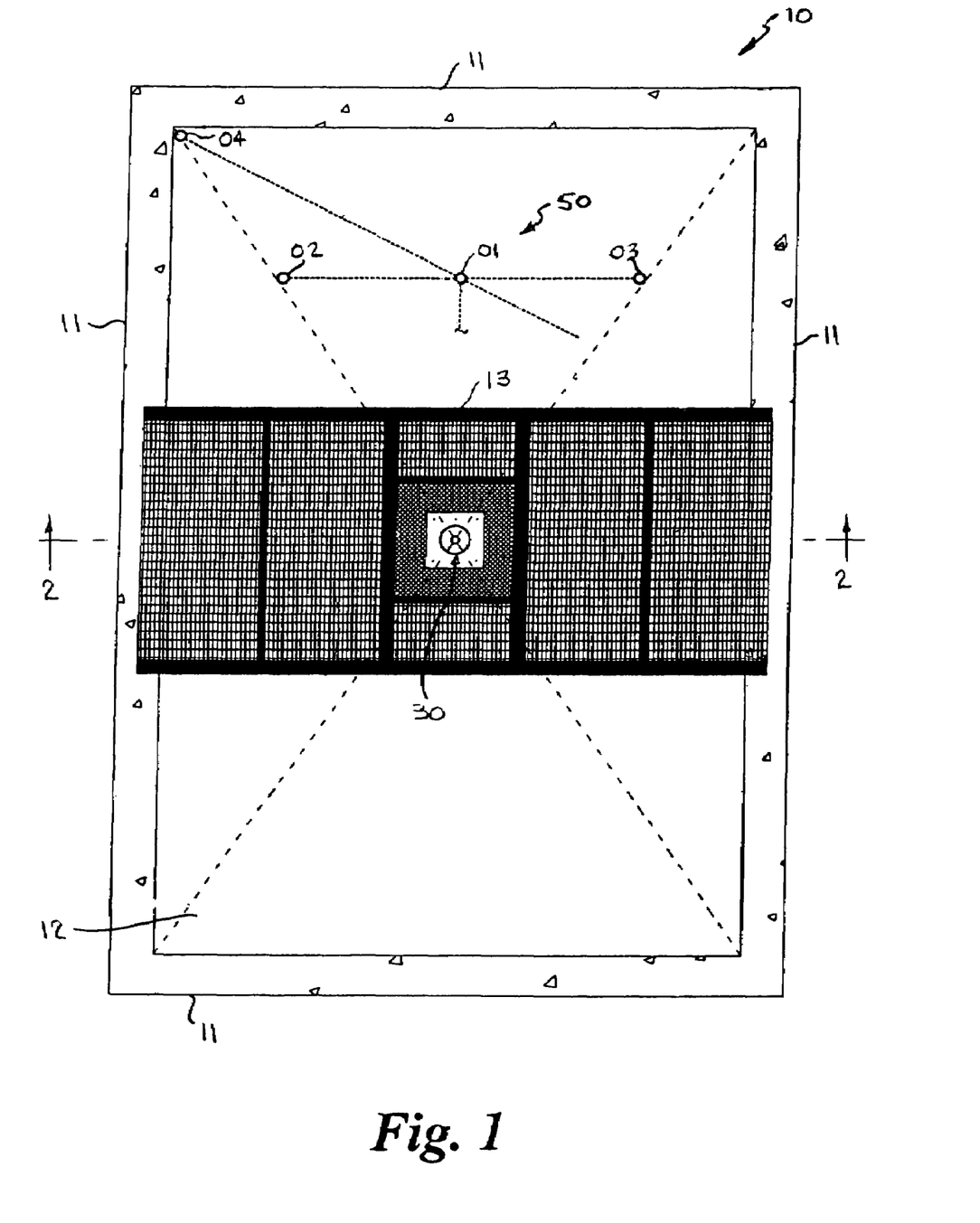
FIG. 1 is a top plan view of a pool or aeration tank of the water aeration system in accordance with the present invention.
Figure 2:
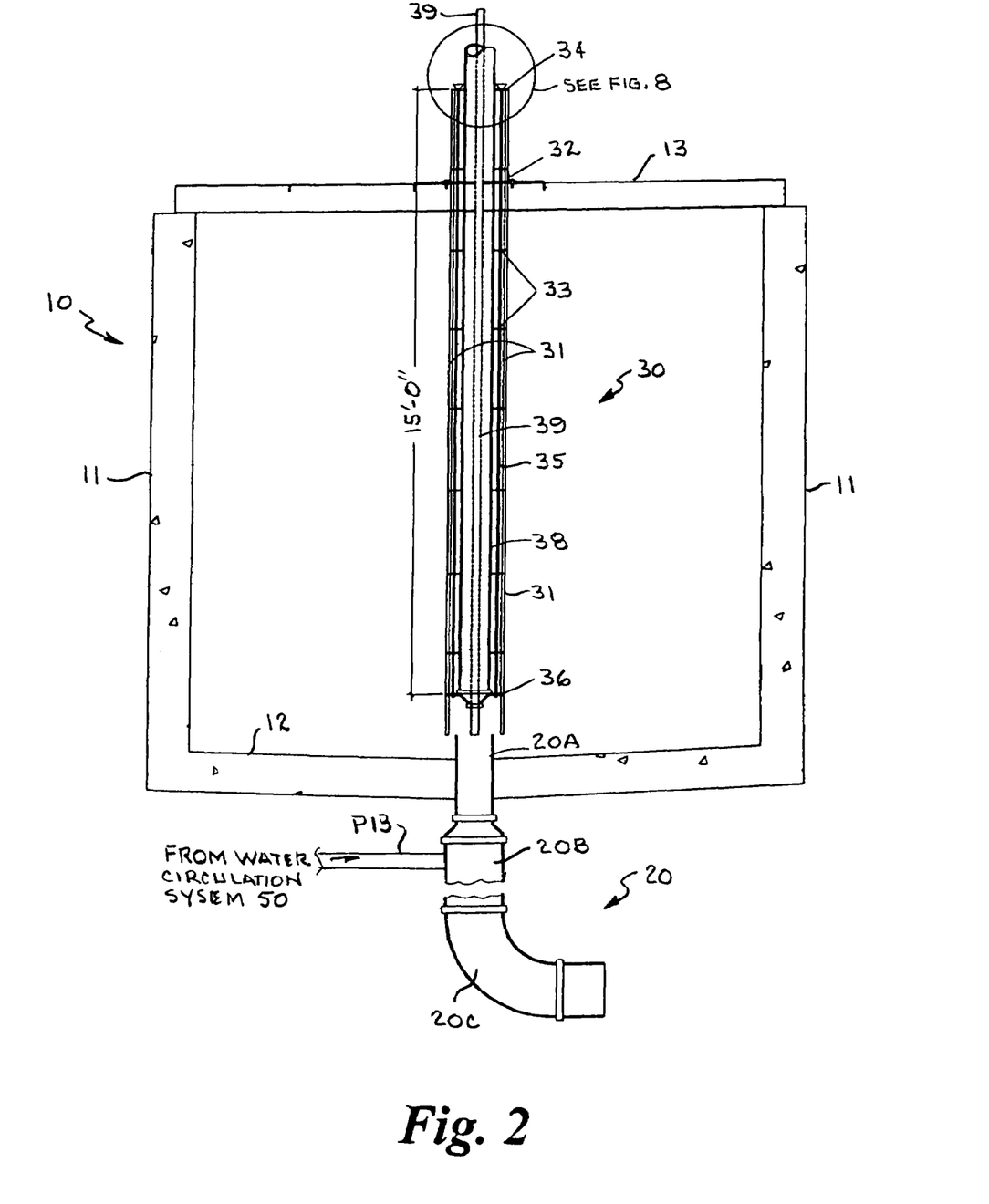
FIG. 2 is a transverse cross section view of the pool or aeration tank taken along line 2-2 of FIG. 1, showing the air supply piping arrangement.

Referring now to the drawings by numerals of reference, there is shown in FIGS. 1 and 2, a generally rectangular pool or aeration tank 10 having four side walls 11 and a bottom wall 12. In the illustrated example of a system handling 250 liters of water per second, the pool or aeration tank 10 is approximately 12 feet wide, 20 feet long, 12 feet in depth, and the side walls and bottom wall are approximately 1 foot thick. The pool or aeration tank 10 is shown as being formed of concrete, however, it should be understood that it may be formed of concrete, fiberglass, metal or plastic, and may be of a shape other than rectangular.

The bottom wall 12 of the pool or aeration tank 10 slopes inwardly and downwardly from the side walls 11 to the inlet pipe 20A of a bottom piping assembly 20 at the center (described below). A metal frame bridge structure 13 extends transversely across the open top end of the pool or aeration tank 10 and supports a vertical air supply piping assembly 30 (described below) at the center of the pool or aeration tank. The air supply piping assembly 30 is supported in vertical alignment with the open end of the inlet pipe 20A of the bottom piping assembly 20 at the bottom of the pool or aeration tank, and the air inlet of the air supply piping assembly 30 is disposed above the water level. As shown in dashed line in FIG. 1, a water circulation assembly 50 (described below) is disposed in the pool or aeration tank 10 near one end.

Bottom Piping Assembly

Referring now to FIGS. 2, 3, 4 and 5, the bottom piping assembly 20 is preferably formed of PVC pipe and includes a straight inlet pipe 20A approximately 10" to 16" in diameter that is mounted vertically in the center of the bottom wall 12 with its open top end extending approximately 6" above the bottom wall, connected with a second straight 16" diameter pipe 20B approximately 20 feet in length which is connected to a 90° ell 20C. A first one of a plurality of "step-down" pipe assemblies 21 is connected to the ell 20C. Each of the "step-down" pipe assemblies 21 is formed of a first and second section of 16" diameter pipe 21A and 21B, respectively, connected together by a pair of 45° ells 21C, such that the longitudinal axis of the first and second pipe sections are each disposed horizontally with the longitudinal axis of the second pipe section 21B spaced a distance vertically below the longitudinal axis of the first pipe section 21A.

Figure 5:
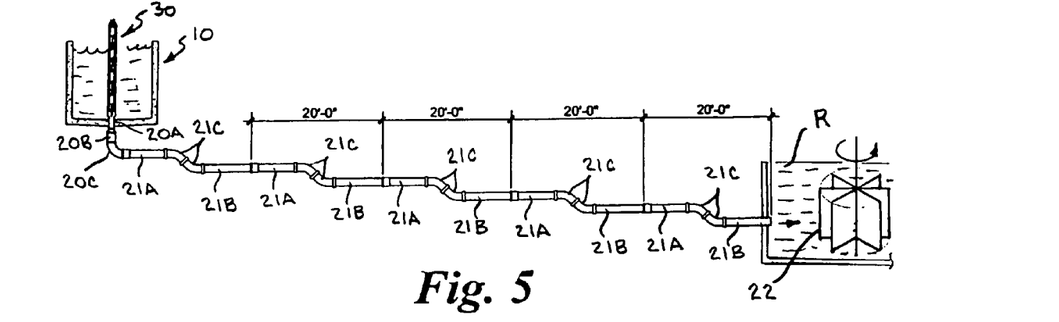
FIG. 5 is a side elevation showing, somewhat schematically, the pool or aeration tank with the bottom pipe assembly containing a plurality of the step-down pipe assemblies extending outward and downward from the pool or aeration tank.

As shown in FIG. 5, in the illustrated example, there are five "step-down" pipe assemblies 21 adjoined to the 90° ell 20C extending outward and incrementally downward from the pool or aeration tank 10, however, the number may vary depending upon the particular installation. Thus, in effect, the water exiting the pool or aeration tank 10 through the bottom piping assembly 20 flows "downhill", without the use of pumps. As shown schematically in FIG. 5, the aerated water exiting the pipe assemblies 21 may flow into a reservoir R or a second body of water where it passes across a paddlewheel 22 to disburse the aerated water evenly throughout the entire body of water and circulate the water to allow the surface of the body of water to absorb even more oxygen from the air above the water surface.

Air Supply Piping Assembly

Figure 9:
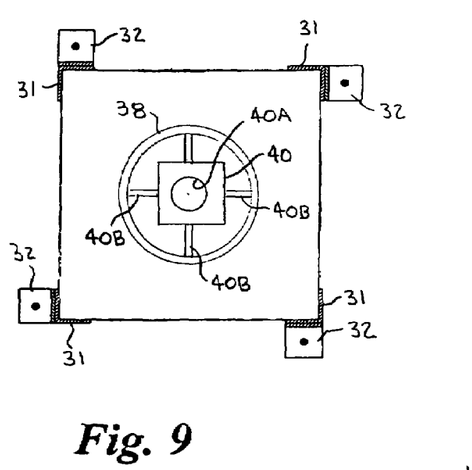
FIG. 9 is a top plan view of the support plate for the 2" diameter pipe.
Figure 10:
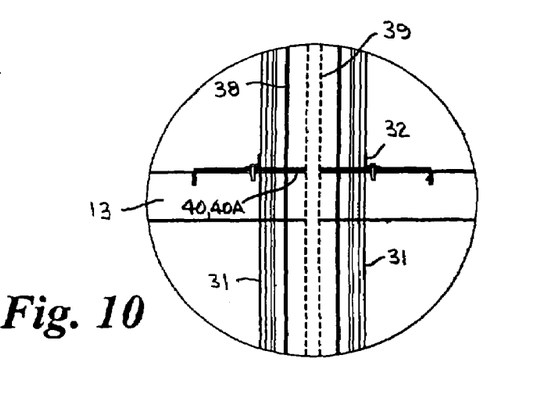
FIG. 10 is a partial cross sectional view showing the connection of the bracing channels of the air supply piping assembly to the bridge.

Referring again to FIG. 2, and additionally to FIGS. 6 through 10, the air supply piping assembly 30 includes an outer bracing or support structure formed of four elongate bracing channels 31 of 1"×1" L-shaped cross section disposed vertically in parallel spaced relation in a square pattern. An L-shaped bracket 32 is secured to the outer side of one leg of each bracing channel near its upper end and the brackets are bolted a plate on the metal frame bridge 13 such that the bracing channels are supported on the bridge with their lower portions extending vertically downward through the bridge and their upper portions extending a relatively short distance above the bridge (FIGS. 2, 9 and 10).

A series of 16" square by ¼" thick intermediate plates 33 (FIG. 7) disposed horizontally in vertically spaced relation within the elongate bracing channels 31 are secured to the channels at their corners and have a central 8½" diameter hole 33A therethrough. The 16" square by ¼" thick intermediate plates 33 are spaced apart by a distance of approximately 2 feet, and each has a pair of laterally spaced smaller diameter holes 33B spaced outwardly to each side of the 8½" diameter hole, through which elongate adjustment bolts pass (described hereinafter).

A 16" square by ½" thick top plate 34 (FIGS. 7 and 8) having a central 8½" diameter hole 33A and a pair of laterally spaced smaller diameter holes 33B spaced outwardly to each side thereof is secured at its corners within the elongate bracing channels 31 at their top ends. As shown schematically in FIG. 8, the shank 35A of an elongate adjustment bolt 35 extends through respective laterally spaced smaller diameter holes 33B of the intermediate plates 33 and the top plate 34, and the head 35B of each bolt is supported on the top plate.

Figure 3:
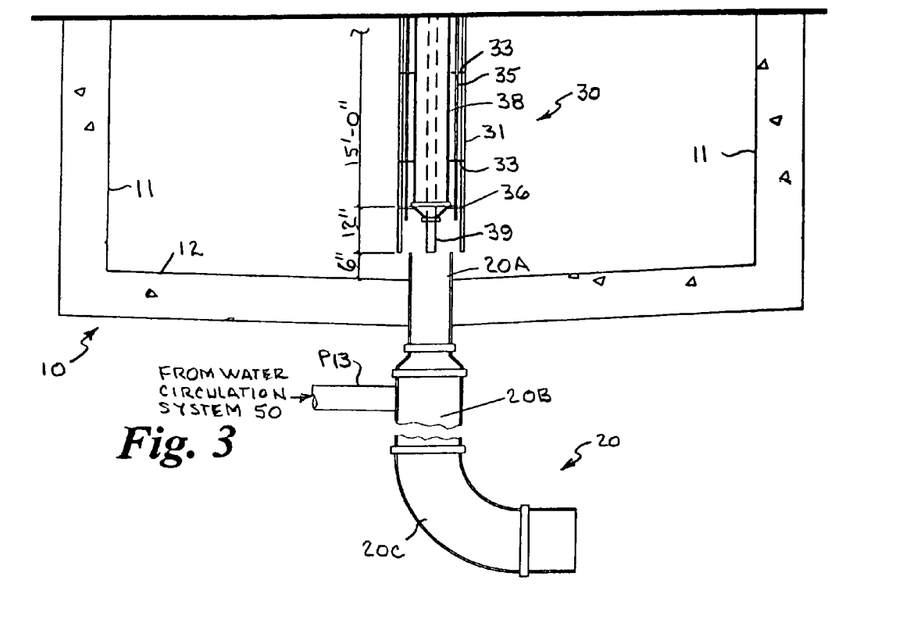
FIG. 3 is a transverse cross section view through the lower portion of the pool or aeration tank, showing the inlet portion of the bottom piping assembly.
Figure 4:
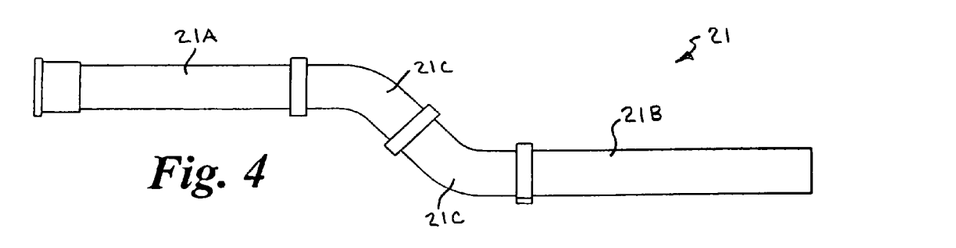
FIG. 4 is a side elevation of a transverse cross section view through a step-down pipe assembly, which is a sub-assembly component of the bottom piping assembly.
Figure 6:
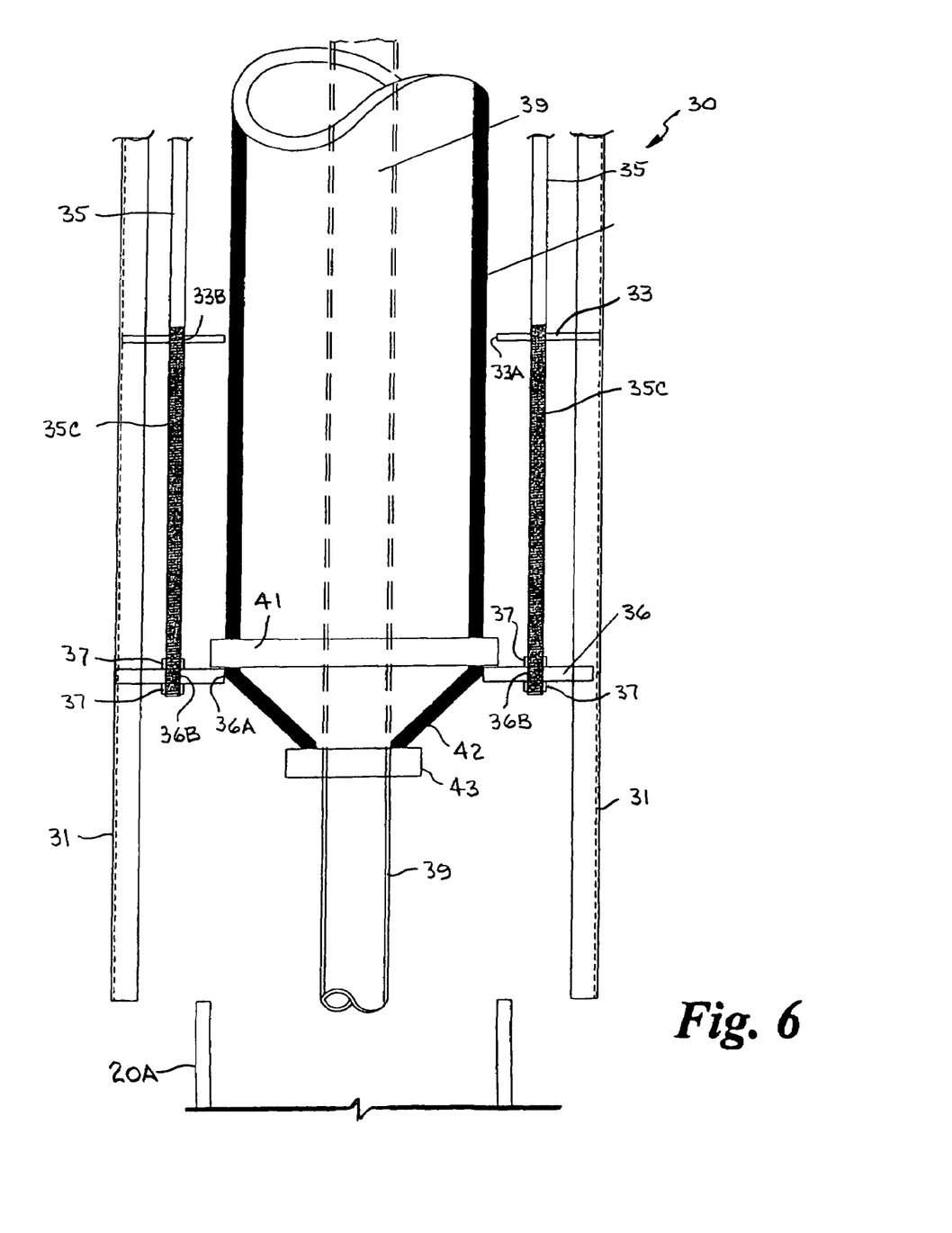
FIG. 6 is a longitudinal cross section view through the lower portion of the air supply piping assembly, which is supported in vertical alignment with the inlet of the bottom piping assembly.
Figure 7:
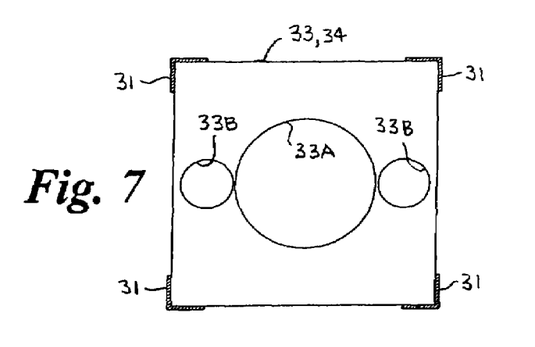
FIG. 7 is a top plan view of the intermediate plates of the air supply piping assembly.
Figure 8:
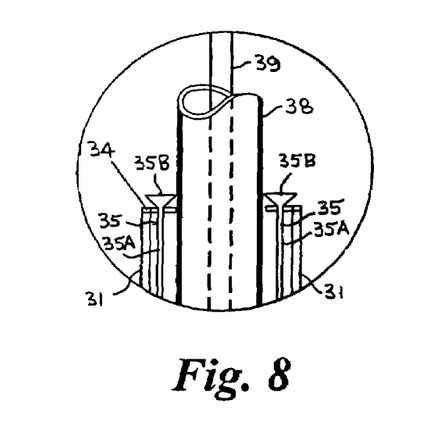
FIG. 8 is cross sectional view showing the top plate of the air supply piping assembly.

As best seen in FIGS. 3 and 6, a 15⅞" square by ½" thick traveling bottom plate 36 having a central 8½" diameter hole 36A and a pair of laterally spaced smaller diameter holes 36B spaced outwardly to each side thereof is slidably disposed within the elongate bracing channels 31 near their bottom ends, and is not secured thereto. An internally threaded nut 37 is secured to the top and bottom surfaces of the traveling bottom plate 36 in axial alignment with its smaller diameter holes. The shank 35A of each adjustment bolt 35 has an externally threaded lower portion 35C, which is threadedly engaged through the nuts 37 and extends through the bottom plate 36. Thus, rotation of the laterally spaced elongate adjustment bolts 35 causes the traveling bottom plate 36 to move vertically up or down relative to the bracing channels 31.

The air supply piping assembly 30 includes an elongate 8" diameter outer pipe 38 and a concentric 2" diameter inner pipe 39 mounted therein that extends through its center. The upper portion of the 2" diameter pipe extends through a 2½" diameter hole 40A in a smaller square plate 40 (FIGS. 9 and 10), which is supported horizontally in the 8" diameter pipe 38 by braces 40B in a plane adjacent to the metal frame bridge. It should be understood that the 2" diameter pipe 39 may be supported within the 8" diameter pipe 38 by means other than the manner shown in the illustrated example. The top ends of the 8" diameter outer pipe 38 and 2" diameter inner pipe 39 are open to the atmosphere.

As best seen in FIG. 6, the 8" diameter pipe 38 that surrounds the 2" diameter pipe 39 has a flange 41 and a reducer 42 at its bottom end that tapers inward and downward to a smaller flange 43 surrounding the 2" diameter pipe. The larger flange 41 at the bottom end of the 8" diameter pipe 38 is supported on the top surface of the traveling bottom plate 36 and the reducer 42 and smaller flange 43 are disposed beneath the traveling bottom plate. The 2" diameter pipe 39 extends beyond the smaller flange 43 at the bottom end of the reducer 42 and its bottom end terminates approximately even with the bracing channels 31. Thus, rotation of the laterally spaced elongate adjustment bolts 35 causes the traveling bottom plate 36 and the 2" and 8" diameter air supply piping 38 and 19 to move vertically up or down relative to the bracing channels 31.

As shown in FIGS. 2 and 3, the longitudinal vertical axis of the 2" and 8" diameter air supply piping 38 and 39 is axially aligned with the longitudinal vertical axis of the straight inlet pipe 20A of the bottom piping assembly 20. In the illustrated example, the traveling bottom plate 36 is initially disposed approximately 15 feet below the top plate 34, and approximately 12" above the bottom ends of the bracing channels 31. The open top end of the straight inlet pipe 20A of the bottom piping assembly 20 is disposed approximately 6" above the bottom wall 12 of the pool or aeration tank 10, and the bottom end of the 2" diameter pipe 39 and bracing channels 31 are disposed approximately even with the top end of the straight inlet pipe 20A of the bottom piping assembly.

The amount of air supplied to the bottom piping assembly 20 can be controlled by rotating the laterally spaced elongate adjustment bolts 35 to selectively position the bottom end of the 2" diameter pipe 39 at various distances relative to the top end of the inlet pipe 20A of the bottom piping assembly 20 (closer or farther from the inlet pipe).

Water Circulation Assembly

Figure 11:
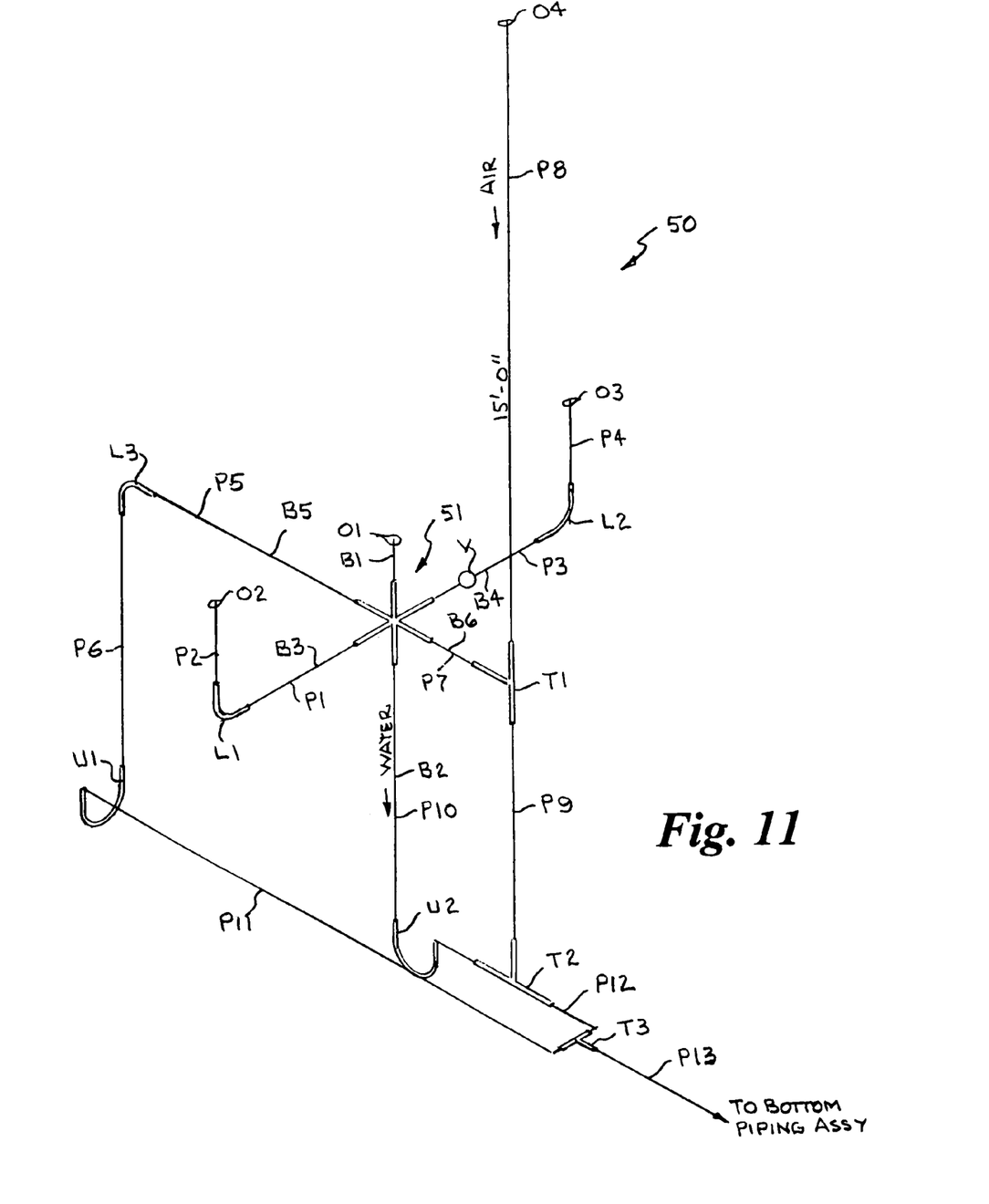
FIG. 11 is a schematic illustration of the pipe distribution assembly showing the six branches.

Referring now to FIGS. 1 and 11, the water circulation assembly 50 will be described. As shown in dashed line in FIG. 1, the water circulation assembly 50 (described below) is disposed in the pool or aeration tank 10 a distance from the elongate air supply piping assembly 30 (FIG. 2), and includes six branches of pipe designated by B1 through B6 joined to a common manifold 51. The flow rate has a direct relationship with the size and diameter of the six branches of pipe, the function and characteristics of each which will now be described with reference to FIG. 11.

The main common manifold 51 has an upper vertical pipe branch B1, a lower vertical pipe branch B2, and four lateral horizontal branches B3, B4, B5, and B6. The upper vertical pipe branch B1 has an open top end O1 disposed at the bottom of the pool or aeration tank 10 and the common manifold 51, and the horizontal portions of the horizontal branches B3, B4, B5, and B6 are cast in the concrete of the pool or aeration tank and joined to common manifold beneath the open end O1 of the pipe branch B1.

The B3 pipe branch has a short section of pipe P1 extending horizontally outward from the common manifold 51 connected by a 90° ell L1 to a short upwardly extending vertical section of pipe P2 having an open end O2, which may be capped.

The B4 pipe branch has a short section of pipe P3 extending horizontally outward from the common manifold 51 in laterally opposed relation to the B3 branch and is connected by a 90° ell L2 to a short upwardly extending vertical section of pipe P4 having an open end O3 which may be capped. A one-way valve V is installed in the horizontal section of pipe P3 in the B4 branch between the manifold 51 and the ell L2.

The B5 pipe branch has a section of pipe P5 extending horizontally outward from the common manifold 51 joined by a 90° ell L3 to a downwardly extending vertical section of pipe P6, which is joined to a first U-trap U1.

The B6 pipe branch has a section of pipe P7 extending horizontally outward from the common manifold 51 and joined by a first tee T1 to an elongate 15-foot vertical section of pipe P8 that extends upwardly from the first tee T1 terminating in an open top end O4 which is open to the atmosphere. A shorter vertical section of pipe P9 extends vertically downward from the first tee T1 and is joined to a second tee T2. As seen in FIG. 1, the open top end O4 of the elongate 15-foot vertical section of pipe is disposed near one corner of the pool or aeration tank.

The lower vertical pipe branch B2 has vertical section of pipe P10 extending downward from the common manifold 51 in axial alignment with the upper vertical pipe branch B1 and is joined to a second U-trap U2. The outlet of the second U-trap U2 is joined to the second tee T2.

The outlet end of the first U-trap U1 and the outlet end of the second tee T2 are connected by pipes sections P11 and P12, respectively, to opposed ends of a third tee T3. Referring additionally to FIGS. 2 and 3, the outlet of the third tee T3 is joined by pipe P13 to the 16" diameter pipe 20B beneath the inlet pipe 20A of the bottom piping assembly 20 that extends from the bottom of the pool or aeration tank 10.

OPERATION

The water on the aeration pool or tank 10 has potential energy due the hydrostatic pressure (atmospheric pressure, the pressure from the specific weight of the water, and depth of the water), and creates a large pressure at the bottom of the aeration pool or tank. The water under pressure flows through the open top end of the inlet pipe 20A of the bottom piping assembly 20 and creates a vacuum due to the differential pressure that draws air from the atmosphere through the elongate air supply piping assembly 30 and mixes it with the water flowing through the bottom piping assembly. The amount of air supplied to the bottom piping assembly 20 can be controlled by rotating the laterally spaced elongate adjustment bolts 35 to selectively position the bottom end of the 2" diameter pipe 39 at various distances relative to the top end of the inlet pipe 20A of the bottom piping assembly 20 (closer or farther from the inlet pipe).

Water under pressure also enters the water circulation assembly 50 through the open end O4 of the B1 pipe branch, and air is drawn from the atmosphere through the open top end O4 of the elongate 15-foot vertical section of pipe P8 of the assembly and into the common manifold 51. The flow of water under pressure into the B1 pipe branch forces existing air out of the entire system of pipe branches B1 through B6, and the air exits near the bottom of the pool or tank through the ends O2 and O3 of the branches B3 and B4 to create turbulence and circulation within in the body of water in the pool or aeration tank.

The aerated water passing from the pool or aeration tank 10 through the bottom piping assembly 20 flows "downhill", without the use of pumps, through the "step-down" pipe assemblies 21 (FIG. 5), into a reservoir R or a second body of water where it passes across a paddlewheel 22 which distributes the aerated water evenly throughout the second body of water and circulates the water to allow the surface of the second body of water to absorb even more oxygen from the air above the water surface.

While this invention has been described fully and completely with special emphasis upon a preferred embodiment, it should be understood that the invention may be practiced otherwise than as specifically described herein.

The invention claimed is:

1. A water aeration system for introducing and mixing oxygen from the atmosphere into a body of water, comprising:

an aeration pool or tank including a bottom wall and at least one side wall defining an internal volume containing a body of water of sufficient depth to create hydrostatic pressure therein;

a bottom water outlet piping assembly including an upstanding water inlet end in said bottom wall positioned within said pool or tank internal volume and having a water outlet end located remote from said pool or tank and a distance vertically below said inlet end through which water under pressure is conducted from said pool or tank by gravity; and a vertically disposed air inlet piping assembly including an upstanding air inlet end positioned above the water surface in communication with the atmosphere and an air outlet end positioned within said pool or tank closely adjacent to said bottom wall and axially aligned with a longitudinal vertical axis of said water inlet end of said bottom water outlet piping assembly and vertically adjustable relative thereto for conducting air from the atmosphere into said body of water closely adjacent to said water inlet end; whereby water exiting through said water inlet end of said bottom water outlet piping assembly draws air from the atmosphere through said air inlet piping assembly and is mixed with the water exiting through said water inlet end of said water outlet piping assembly such that the exiting water becomes aerated.

2. The water aeration system according to claim 1, further comprising:

a second body of water joined in fluid communication with said water outlet end of said bottom water outlet piping assembly; and a paddlewheel rotatably disposed in said second body of water adjacent to said water outlet end of said bottom water outlet piping assembly over which aerated water exiting through said water outlet end of said bottom water outlet piping assembly passes; whereby rotation of said paddlewheel disburses the aerated water into said second body of water and causes circulation of said second body of water to allow the surface of the second body of water to absorb additional oxygen from the air above the water surface.

3. The water aeration system according to claim 1, wherein said bottom water outlet piping assembly comprises a plurality of step-down pipe assemblies connected in fluid communication with said water inlet end, each of said step-down pipe assemblies formed of a first and second section of pipe connected together such that the longitudinal axis of the first and second pipe sections are each disposed horizontally with the longitudinal axis of the second pipe section spaced a distance vertically below the longitudinal axis of the first pipe section.

4. The water aeration system according to claim 3, wherein said bottom water outlet piping assembly comprises a first straight inlet pipe section mounted vertically in said bottom wall with an open top end defining said water inlet end extending a short distance above said bottom wall in fluid communication with said pool or tank internal volume, and a second straight pipe section connected in fluid communication with said plurality of step-down pipe assemblies.

5. The water aeration system according to claim 4, wherein said first straight inlet pipe section, said second straight pipe section, and said first and second sections of pipe of said step-down pipe assemblies have a diameter which is larger than the diameter of said an air inlet piping assembly.

6. The water aeration system according to claim 4, wherein said first straight inlet pipe section, said second straight pipe section, and said first and second sections of pipe of said step-down pipe assemblies are formed of PVC pipe.

7. The water aeration system according to claim 1, wherein said air inlet piping assembly comprises an elongate larger diameter outer pipe and a concentric smaller diameter inner pipe mounted therein that extends through its center, the top end of said smaller diameter inner pipe defining said upstanding air inlet end and its bottom end defining said air outlet end.

8. The water aeration system according to claim 1, further comprising:

a water circulation piping assembly in said pool or tank connected in fluid communication with said bottom water outlet piping assembly, including a plurality of pipe branches joined to a common manifold, at least one said pipe branches having a water inlet positioned within said pool or tank closely adjacent to said bottom wall, another one of said pipe branches having an open end positioned above the water surface in communication with the atmosphere, and at least another one of said pipe branches having an outlet end positioned within said pool or tank closely adjacent to said bottom wall; whereby water under pressure in said pool or tank also enters said water circulation piping assembly, and air is drawn from the atmosphere into said common manifold, and the flow of water under pressure into said pipe branches forces air out of said piping assembly near said the bottom wall of said pool or tank to create turbulence and circulation within in the body of water in said pool or tank.

9. The water aeration system according to claim 8, wherein said water circulation piping assembly common manifold has a first upper vertical pipe branch, a second lower vertical pipe branch, and a plurality of lateral horizontal branches, said first upper vertical pipe branch having an open top end disposed closely adjacent to said bottom wall, and said common manifold, and horizontal portions of said lateral horizontal branches are mounted in said bottom wall and joined to said common manifold beneath its said open end.

10. The water aeration system according to claim 9, wherein
- a first one of said lateral horizontal branches comprises a section of pipe extending horizontally outward from said common manifold connected at an outer end to an upwardly extending vertical section of pipe having an open end, a second one of said lateral horizontal branches comprises a section of pipe extending horizontally outward from said common manifold connected at an outer end through a one-way valve to an upwardly extending vertical section of pipe;
- a third one of said lateral horizontal branches comprises a section of pipe extending horizontally outward from said common manifold connected at an outer end to a downwardly extending vertical section of pipe which is joined to a first U-trap;
- a fourth one of said lateral horizontal branches comprises a section of pipe extending horizontally outward from said common manifold and joined by a first tee to an elongate vertical section of pipe extending upwardly from said first tee terminating in an open top end which is open to the atmosphere, and a shorter vertical section of pipe extends vertically downward from said first tee joined to a second tee;
- said second lower vertical pipe branch comprises a section of pipe extending vertically downward from said common manifold joined to a second U-trap, the outlet of which is joined to said second tee;
- the outlet end of said first U-trap and the outlet end of said second tee are connected via piping, respectively, to opposed ends of a third tee; and
- the outlet of said third tee is joined in fluid communication with said bottom water outlet piping assembly.

11. A method for aerating water by introducing and mixing oxygen from the atmosphere into a body of water, comprising the steps of:
- providing an aeration pool or tank containing a body of water of sufficient depth to create hydrostatic pressure therein;
- providing a water outlet piping assembly including an upstanding water inlet end positioned at a bottom of said pool or tank and a water outlet end located remote from said pool or tank and a distance vertically below said inlet end;
- providing a vertically disposed air inlet piping assembly including an upstanding air inlet end positioned above the water surface in communication with the atmosphere and an air outlet end positioned within said pool or tank closely adjacent to said pool or tank bottom axially aligned with a longitudinal vertical axis of said water inlet end of said bottom water outlet piping assembly and vertically adjustable relative thereto; and
- allowing water under pressure to flow from said pool or tank by gravity through said water inlet end of said bottom water outlet piping assembly to draw air from the atmosphere through said an air inlet piping assembly and mix the air with the water exiting through said bottom water outlet piping assembly such that the exiting water becomes aerated.

12. The method according to claim 11, comprising the further steps of:
- conducting the aerated water flowing through said bottom water outlet piping assembly into a second body of water across a rotatable paddlewheel to cause rotation thereof such that the aerated water is disbursed into said second body of water and create circulation of said second body of water to allow the surface of the second body of water to absorb additional oxygen from the air above the water surface.

13. The method according to claim 11, comprising the further step of:
- providing a water circulation piping assembly in said pool or tank connected in fluid communication with said bottom water outlet piping assembly, including a plurality of pipe branches joined to a common manifold, at least one said pipe branches having a water inlet positioned within said pool or tank closely adjacent to the bottom thereof, another one of said pipe branches having an open end positioned above the water surface in communication with the atmosphere, and at least another one of said pipe branches having an outlet end positioned within said pool or tank closely adjacent to the bottom thereof; and
- allowing water under pressure in said pool or tank to enter said water circulation piping assembly whereby air is drawn from the atmosphere into said common manifold, and the flow of water under pressure into said pipe branches forces air out of said piping assembly near the bottom of said pool or tank to create turbulence and circulation within in the body of water in said pool or tank.

* * * * *